United States Patent
Kubal et al.

(10) Patent No.: US 8,242,719 B2
(45) Date of Patent: Aug. 14, 2012

(54) CONNECTION OF AN ELECTRIC MOTOR TO A SUPPLY NETWORK

(75) Inventors: Shekhar Kubal, Vaasa (FI); Stefan Strandberg, Vörå (FI); Ahti Rauma, Vaase (FI)

(73) Assignee: Vacon Oyj, Vaasa (FI)

( * ) Notice: Subject to any disclaimer, the term of this patent is extended or adjusted under 35 U.S.C. 154(b) by 778 days.

(21) Appl. No.: 12/394,947

(22) Filed: Feb. 27, 2009

(65) Prior Publication Data
US 2009/0218962 A1    Sep. 3, 2009

(30) Foreign Application Priority Data
Feb. 29, 2008 (FI) .................................... 20085186

(51) Int. Cl.
*H02P 5/00* (2006.01)
*H02P 5/46* (2006.01)

(52) U.S. Cl. ........ 318/105; 318/102; 318/430; 318/779; 318/455; 318/503; 363/34; 361/31; 361/699

(58) Field of Classification Search .................. 318/102, 318/105, 430, 779, 455, 503; 363/34; 361/31, 361/699
See application file for complete search history.

(56) References Cited

U.S. PATENT DOCUMENTS

| 5,859,514 | A | 1/1999 | Chouffier et al. |
| 6,282,910 | B1 | 9/2001 | Helt |
| 8,014,110 | B2 * | 9/2011 | Schnetzka et al. .............. 361/31 |
| 2004/0159115 | A1 | 8/2004 | Matsunaga et al. |

FOREIGN PATENT DOCUMENTS

| DE | 44 06 794 B4 | 9/1995 |
| GB | 2 054 295 A | 2/1981 |
| JP | 61-154498 A | 7/1986 |
| JP | 2006-345583 A | 12/2006 |
| SU | 1654957 A1 | 6/1991 |

* cited by examiner

*Primary Examiner* — Walter Benson
*Assistant Examiner* — Erick Glass
(74) *Attorney, Agent, or Firm* — Birch, Stewart, Kolasch & Birch, LLP

(57) ABSTRACT

Method and arrangement for connecting an AC electric motor ($M_1, M_2, \ldots M_N$) to an AC electricity network (L) in a system which comprises a frequency converter (FC), with which the motor is started, and contactors ($S_{11}, S_{12}, S_{21}, S_{22}, S_{N1}, S_{N2}$), in which method the supply source is changed by means of the contactors from the frequency converter to a direct network supply, in which method the frequency converter is stopped before changing the supply source, and in which method in connection with changing the supply source the control of the contactors is started before stopping the frequency converter.

20 Claims, 3 Drawing Sheets

CONNECTION OF AN ELECTRIC MOTOR TO A SUPPLY NETWORK

CROSS-REFERENCE TO RELATED APPLICATION

Figure 1:
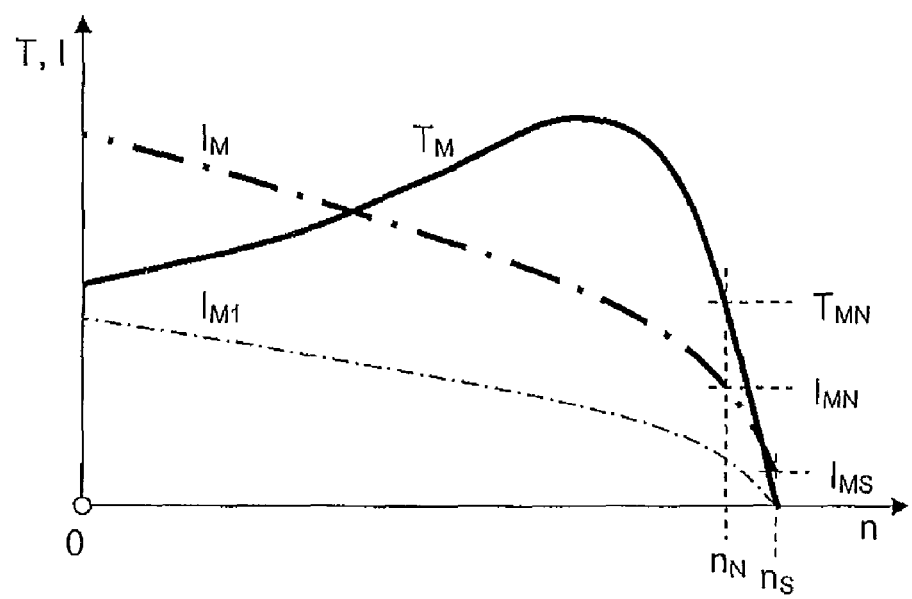

The present application claims priority under 35 U.S.C. §119 to Finnish Patent Application No. 20085186, filed Feb. 29, 2008

FIELD OF TECHNOLOGY

The object of this invention is a method and an arrangement for connecting an electric motor to a supply network.

More particularly, the object of the invention is a method and an arrangement for connecting an AC electric motor to an AC electricity network in a system which comprises a frequency converter, with which the motor is started, and contactors, with which the supply source is changed from the frequency converter to a direct network supply.

BACKGROUND TO THE INVENTION AND PRIOR ART

Electric motors are used almost everywhere in society to produce different mechanical movements, for example, rotating pumps and fans. There are numerous different types of electric motors, of which the most common is the so-called squirrel-cage motor.

The connection of a squirrel-cage motor to the network is known to cause a substantial switching current surge; the current taken from the network when starting can transiently be over 6 times the rated current. This kind of current surge often causes problems, such as the need to dimension the fuses and cables of the supply circuit to be larger than the load during actual operation would require, as well as the extra costs incurred by this kind of over-dimensioning. Generally the larger the power output of the motor is in question, the larger problem the switching current surge is.

One prior-art solution for reducing the starting current is to use a so-called soft starter, which may include a circuit implemented with thyristors, with its control unit, and in which the control angle of the thyristors is controlled so that the voltage of the motor decreases to avoid the over large current of the starting phase. This type of solution is known, for example from publications DE4406794 and U.S. Pat. No. 5,859,514. A drawback of the solution is the cost of starting and the power loss during operation as the motor current runs continuously through it. In order to reduce continuous power loss, the prior art solution bypass the soft starter by connecting the motor directly to the network after the starting phase with a shunt contactor.

The use of a frequency converter for starting the motor without a switching current surge is also a well-known solution. When the load requires a varying speed of rotation, the use of a frequency converter is otherwise a natural solution. If, however, the load of the motor allows continuous operation at a fixed frequency of the supply network, the prior art solutions use a shunt circuit implemented with contactors to minimize power losses, with which shunt circuit the motor is disconnected after the starting phase from the frequency converter and connected directly to the network. A shunt circuit may be used in the prior-art pump automatics according to FIG. 2a, in which one frequency converter and a number of motors of which each can be connected either to the frequency converter, or directly to the network. With the solution the total flow produced by the pumps can be steplessly adjusted from zero up to maximum delivery, in which case all the motors operate at their rated speed.

Also a motor accelerated to its rated speed with a frequency converter can take a substantial connection current surge, even greater than the starting situation, when it is connected directly to the network. This occurs if the amplitude and phase angle of the so-called residual voltage evident in the connectors of the motor after disconnecting from the frequency converter differ from the amplitude and phase angle of the supply network at the time when the motor is connected directly to the network. Owing to the deceleration of a loaded motor and the switching delays of the contactors, which can be in the range 40 . . . 100 ms, a simple and reasonably priced prior-art method or arrangement to synchronize the residual voltage and the voltage of the supply network at the time of connection is not found.

SUMMARY OF THE INVENTION

The solution according to the present invention is to avoid the problems of prior art and to minimize the switching current surge.

The frequency converter according to the present invention controls via its own signal interfaces the contactors used for the shunt, either by giving timing pulses to the external control logic of the contactors, or by itself directly controlling each contactor with its own signal. To enable precise timing of the controls, the control unit of the frequency converter possesses information about its own data processing time and the lengths of the switching delays of the contactors, which delays are either given as parameter data or they are measured. Also, the deceleration of the motor during the time between disconnection from the frequency converter and connection to the network can either be given as parameter data, or it can be measured when circuits of the frequency converter measure the output voltage.

According to a preferred embodiment of the present invention, a frequency converter is used in starting the motor, and the frequency converter includes means for measuring the instantaneous value of the voltage of the supply network. This is the foundation for being able to bring the supply voltage of the motor connected to the frequency converter before the stop required by the shunt to the desired magnitude and to the desired phase shift with the voltage of the supply network through the action of the control unit of the frequency converter.

On the basis of the identification data listed above, according to the present invention, the control unit of the frequency converter can time the phase shift of the voltage supplied to the motor before the stop with respect to the network, as well as the controls of the contactors. As a result, the delay between the stopping of the frequency converter and the connection of the motor to the network is minimized, and the residual voltage of the motor at the time of switching to the network is co-phasal with the voltage of the supply network. In this way, the voltage difference between the supply network and the connectors of the motor are minimized, as a result of which the current surge when switching to the direct network supply can be almost completely avoided.

The characteristic features of the method and of the arrangement according to the present invention are described in detail in the description below.

The present invention is suited for use in all cases in which a motor supplied with a frequency converter provided with a shunt is used. A preferred embodiment of an application of the present invention is the multimotor drive according to FIG. 2a. Here, one frequency converter can manage both the stepless regulation of the process in the whole delivery range as well as the starting and connection to the network supply of each motor while minimizing the connection current surge.

SHORT DESCRIPTION OF THE DRAWINGS

Figure 2A:
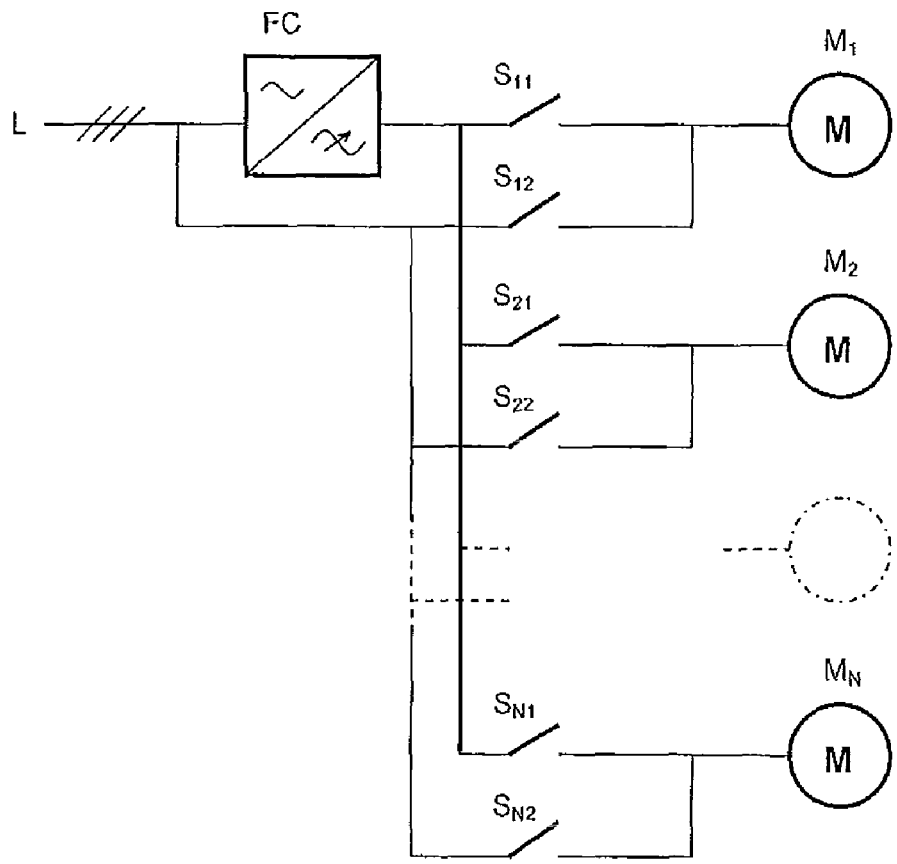
Figure 2B:
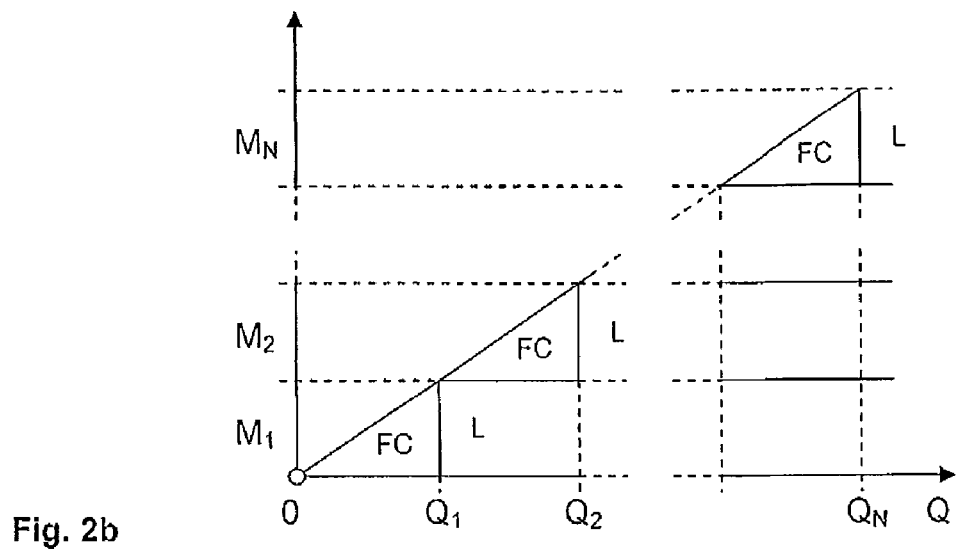
Figure 3:
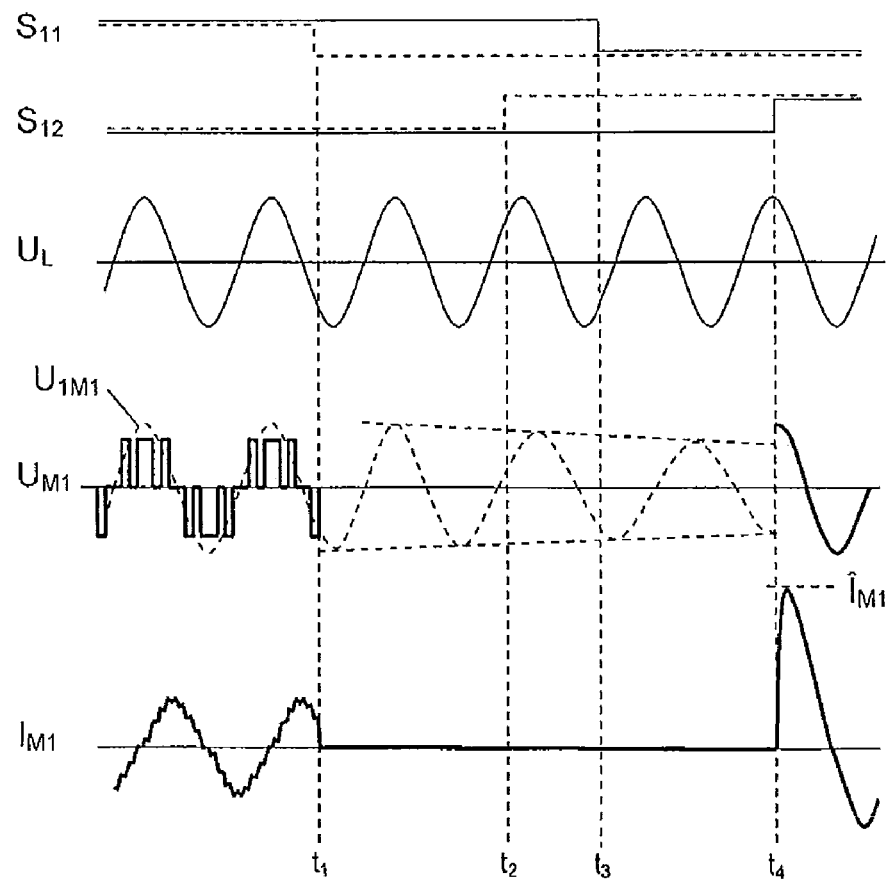
Figure 4:
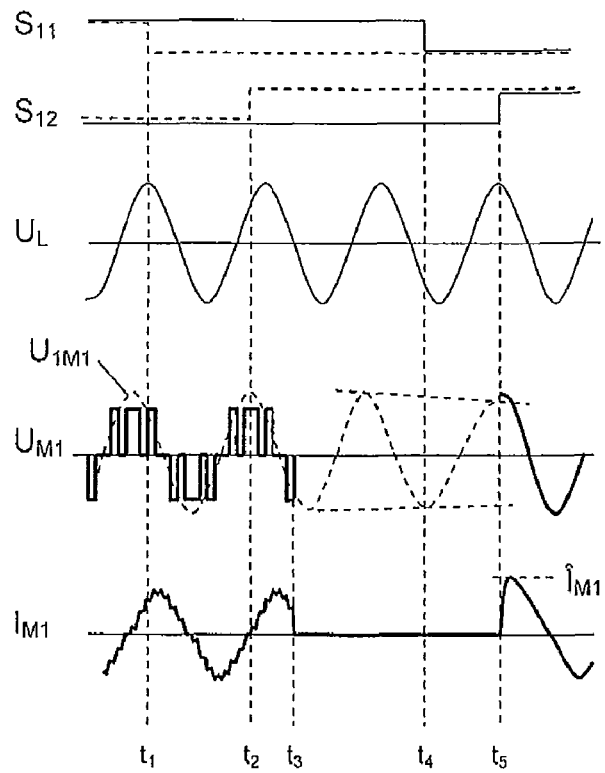
Figure 5:
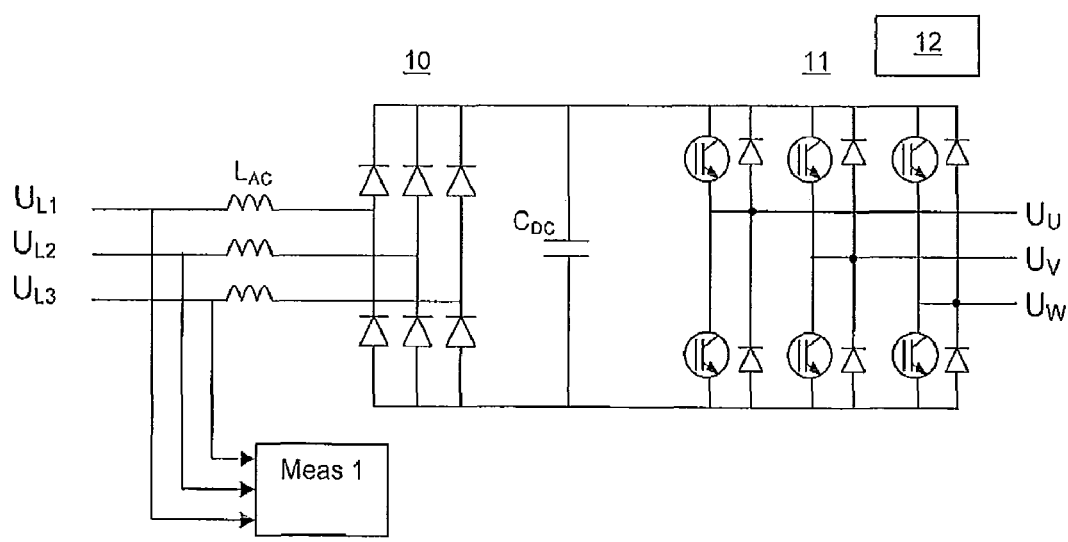

In the following, the invention will be described in more detail by the aid of some embodiments with reference to the attached drawings, wherein FIG. 1 presents prior art characteristic curves of a squirrel-cage motor, FIG. 2a presents a multimotor drive provided with a shunt of the present invention, FIG. 2b presents the control of a multimotor drive provided with a shunt of the present invention, FIG. 3 presents operation in a shunting situation according to prior art, FIG. 4 presents operation in a shunting situation according to the present invention, and FIG. 5 presents a frequency converter according to the present invention.

DETAILED DESCRIPTION OF EMBODIMENTS OF THE INVENTION

FIG. 1 presents prior-art characteristic curves typical of the current $I_M$ and the torque $T_M$ of a squirrel-cage motor supplied with a constant voltage. In the figure the horizontal axis has a speed of rotation n and the vertical axis a torque T and current I. According to FIG. 1, the speed of rotation of the motor at the rated point is $n_N$, the torque $T_{MN}$ and the current $I_{MN}$, and also the speed of rotation at the so-called synchronous operating point is $n_S$, the torque 0 and the current $I_{MS}$. At the time of starting, when the speed of rotation is still 0, the current $I_M$ is generally many times greater compared to the rated current, which can be a problem from the viewpoint of dimensioning the supply circuit.

To avoid a large starting current, conventional systems use a so-called soft starter, which reduces the voltage supplied to the motor when starting. At a lower voltage the characteristic curves of the motor are lower, for example, in the manner of the current curve $I_{M1}$ presented by FIG. 1, in which case the starting current remains correspondingly smaller. As the speed of rotation accelerates towards the rated speed, the soft starter correspondingly also raises the voltage towards the rated value. Owing to the low starting voltage, the starting torque also remains low, which can be a problem in some cases.

It is known that the torque curve of a motor follows the same shape as the supply frequency of the motor. The starting of a motor provided with a frequency converter is based on this, with which it is possible to achieve full torque during the full time of acceleration. In addition, since a frequency converter generally takes only effective power from the supply network, and the network current is small at low frequencies.

FIG. 2a presents a multimotor drive provided with a so-called shunt drive in an embodiment of the present invention which includes a three-phase supply network L, a frequency converter FC and the motors $M_1$, $M_2$, ... $M_N$. In this embodiment there are two contactors for each motor, with which the motors can be connected either to the frequency converter FC, or to the supply network L. For example, the motor $M_1$ connects to the frequency converter when the contactor $S_{11}$ is closed, and to the network L when the contactor $S_{12}$ is closed. A corresponding circuit is in connection with each motor. The control logic of the contactors ensures that only one motor is connected to the frequency converter at a time, and that the other motors are simultaneously connected to the network L according to how the process connected to the motors requires.

FIG. 2b is an example of how a multimotor drive of the present invention according to FIG. 2a can be controlled. In the example, the motors rotate pumps, the total delivery of which is presented on the horizontal Q axis of FIG. 2b. The vertical axis shows which motors are running with the different deliveries. According to the example, when the aggregated needed delivery of the pumps is between 0 ... $Q_1$, only the motor $M_1$ is running, under the control of the frequency converter FC. The frequency converter control enables stepless control of the delivery of the pump.

When the delivery need exceeds the limit value $Q_1$, the motor $M_1$ is connected to the network supply (L) and the motor $M_2$ to the frequency converter supply (FC). Thus, the pump rotated by the motor $M_1$ produces a constant delivery $Q_1$, and an additional delivery between $Q_1$ ... $Q_2$ is steplessly achieved with the pump that rotates the motor $M_2$. This is correspondingly done in connection with the other motors as the total delivery need increases, so that a steplessly controllable delivery is achieved in the complete delivery range 0 ... $Q_N$ with one frequency converter by connecting it in turn to control each motor.

FIG. 3 presents how the change of supply of the example motor $M_1$ according to FIG. 2a from the frequency converter to the network can occur according to prior art. The signal markings used in the figure are as follows:

$S_{11}$ and $S_{12}$ present the positions of the correspondingly named contactors in FIG. 2a as a function of time,
  signal up=the control is active and the contactor in the closed position,
  signal down=uncontrolled and contactor in the open position,
  dashed line=control signal of contactor (voltage of control coil),
  unbroken line=actual position of contactor $U_L$ presents the curve of one main voltage of the network current, the cycle time of which is, e.g., 20 ms (in a 50 Hz network).
  $U_{M1}$ presents the corresponding main voltage in the connection point of the motor, and
  $I_{M1}$ presents one phase current of the motor.

In the conventional system illustrated in FIG. 3, the contactor $S_{11}$ is closed before the time $t_1$, so that the motor operates supplied by the frequency converter. The voltage $U_{M1}$ supplied to the motor includes columns formed from the DC voltage of the intermediate circuit of the frequency converter, and the fundamental wave of the voltage pattern is presented by the curve $U_{1M1}$ with dashed lines. In the situation presented in FIG. 3, the fundamental wave of the voltage formed by the frequency converter has been made to be cophasal with and the same magnitude as the network voltage $U_L$.

At the time $t_1$ the changing of the supply of the motor to the shunt is started by giving a stopping command to the frequency converter, which achieves disconnection of the output voltage it forms very quickly, e.g. within 1 ms. After the supply voltage has disconnected the current $I_{M1}$ of the motor also disconnects quickly. However, the voltage in the connection point of the motor remains up, owing to the rotation movement of the rotor and the residual flux of the magnetic circuit, as a continuum to the fundamental wave of the voltage formed by the frequency converter and decaying according to the time constant inherent to the motor. The sinusoidal dashed line presents this so-called residual voltage with the time interval $t_1 \ldots t_4$. Simultaneously with the stopping of the frequency converter the control voltage is disconnected from the contactor $S_{11}$, as a result of which the main contacts open, for example, approximately 50 ms from the time $t_3$ (depending on the size and model of the contactor, the delay can range between e.g. 40 ... 100 ms).

After a suitable delay to avoid simultaneous closure of the contactors, at the time $t_2$ control voltage is connected to the contactor $S_{12}$, as a result of which its main contacts close, for example, after approximately 50 ms. After the contacts have closed, at the time $t_4$ the motor continues its operation supplied by the network (uniform sinusoidal signal on the axis $U_{M1}$).

In the time interval $t_1 \ldots t_4$, when the motor is not supplied from either source, the torque produced by it is 0. As a consequence, the speed of rotation decelerates rapidly, especially since in this situation, and the load connected to the shaft of the motor is at its greatest. The frequency of the residual voltage of the motor is proportional to the speed of rotation, so that the longer the time interval $t_1 \ldots t_4$, the more unpredictable is the phase shift of the residual voltage with respect to the network at the time $t_4$. In the worst case according to the conventional systems illustrated in FIG. 3, the phase shift is 180 degrees, in which case the connection current surge $I_{M1}$ when the shunt contactor closes is the largest possible, up to over 10 times compared to the rated current.

In contrast to the conventional system shown in FIG. 3, FIG. 4 presents how the corresponding change of supply of the example motor $M_1$ from the frequency converter to the network supply can occur according to the present invention. The signal markings used in FIG. 4 are the same as in the conventional system illustrated in FIG. 3.

The switching delays of the contactors according to the present invention are known by the control unit of the frequency converter. The information is either given as parameter data or it is ascertained, for example, in connection with the identification performed during commissioning, in which case the control unit gives a control command to the contactor and measures the delay from the actual position change of the contactor to the feedback data coming from the auxiliary contact of the contactor.

The control unit according to the present invention also knows its own data processing delay, from the time at which the regulation logic of the process gives a stopping command to the frequency converter, to the time at which the control of the semiconductor switches of the power stage of the frequency converter actually ceases. The identification of this delay is essential because a situation in which both the contactors connected to the motor are closed while the power stage is still operating simultaneously normally leads to failure of the power semiconductor switches. The situation in which the power stage is stopped and both the contactors are closed does not lead to failure, although normally it is attempted to avoid this kind of situation.

Also, according to the present invention, the control unit of the frequency converter possesses information about the deceleration of the motor from full speed with a full load when both the supply sources of the motor are disconnected. The deceleration can either be given as a parameter or measured in connection with the identification performed during commissioning, when the frequency converter comprises measuring circuits of the output voltage.

As can be seen from FIG. 4, the control of the contactors be started already before the stopping of the frequency converter. This can be done because the switching delays of the contactors are known and normally they are many tens of milliseconds, whereas the stopping delay of the frequency converter is only in the order of a few milliseconds. When the delays are known, the time delay from the stopping of the frequency converter ($t_3$) to the connection ($t_5$) of the direct network supply can be minimized, being less than 30 ms in the example of FIG. 4. In addition, when the deceleration of the motor is known, the control unit can according to the figure forecast the phase shift of the output voltage of the frequency converter with respect to the network such that at the end of the deceleration period ($t_3 \ldots t_5$) the residual voltage is co-phasal with the supply network.

When the deceleration interval is made according to the invention to be very short, for example, below 20 ms, the effect of the deceleration of the motor can generally be ignored without a great effect on the switching current surge. In this case, measuring circuits of the output voltage of the frequency converter are not needed, and it is sufficient when the output voltage of the frequency converter before stopping is synchronized to be co-phasal with the network.

FIG. 5 is an example of a frequency converter, which according to the present invention includes a measurement part for measuring the network voltage. There may be numerous different types of frequency converters, the most common being the so-called PWM frequency converter presented in the embodiment in FIG. 5. It includes an AC choke $L_{AC}$ that filters harmonics (in place of the AC choke $L_{AC}$ a DC choke disposed in the DC intermediate circuit can also be used), a rectifying bridge 10 formed of power diodes, a capacitor $C_{DC}$ that filters the DC voltage of the intermediate circuit, an inverter 11 including an IGBT power semiconductor switches and diodes, and a control unit 12.

The control unit has a number of tasks. Among others, it manages the starting and stopping of the frequency converter, it forms a pulse pattern according to which the power switches of the inverter are controlled to form the output voltage ($U_U$, $U_V$, $U_W$), and according to the present invention, it also ensures that the fundamental wave of the output voltage is of the desired magnitude and in the desired phase shift with the supply network before the supply source of the motor is changed from the frequency converter to the network. This works such that the frequency converter a measurement part, for example, the card Meas1 that is provided with a transformer, for measuring the voltages of the supply network. Also, the control unit can give the signals needed for controlling the shunt contactors after the command for performing the shunt has arrived and the synchronization is in order. The shunt command can come from an external control circuit, or it can be given by an application program incorporated in the frequency converter's own control unit.

It is obvious to the person skilled in the art that the different embodiments of the invention are not limited solely to the example described above, but that they may be varied within the scope of the claims presented below.

The invention claimed is:

1. A method for connecting at first and second AC electric motors (M1, M2, ... MN) to an AC electricity network (L) in a system which comprises a frequency converter (FC), with which the each of the motors is started, and a pair of contactors (S11, S12, S21, S22, SNI, SN2) corresponding to each of the motors which are switchable in order to change a source of supply voltage of the corresponding motor from the frequency converter (FC) to the AC electricity network (L), the method comprising:

starting control of the pair of contactors which connect the first motor to the frequency converter (FC), stopping the frequency converter (FC) after starting the control of the pair of contactors connected to the first motor, and before changing the source of supply voltage of the first motor from the frequency converter (FC) to the AC electricity network (L), and only then changing the source of supply voltage of the first motor from the frequency converter (FC) to the AC electricity network (L), wherein the contactors are adapted to allow only one of the first and second electric motors to be connected to the frequency converter (FC) at any one time, the other of the first and second electric motors being connected to the AC electricity network (L).

2. The method according to claim 1, further comprising: performing the control of the contactors needed for changing the source of supply voltage by a control unit of the frequency converter (FC).

3. The method according to claim 2, further comprising: measuring lengths of switching delays.

4. The method according to claim 3, further comprising: using the frequency converter (FC) in starting each of the motors, wherein the frequency converter (FC) performs the steps of:
  measuring an instantaneous value of voltage of the AC network (L), and
  controlling the source of supply voltage of the motor connected to the frequency converter (FC) before the stop required by a shunt to a desired magnitude and to a desired phase shift with the voltage of the AC network (L).

5. The method according to claim 2, further comprising: determining a data processing time of the frequency converter (FC) and lengths of switching delays of the contactors for determining the starting time of the control of the contactors such that the control of the contactors are able to be started before the stopping of the frequency converter (FC).

6. The method according to claim 2, further comprising: providing switching delays as parameter data.

7. The method according to claim 2, further comprising: measuring lengths of switching delays.

8. The method according to claim 2, further comprising: using the frequency converter (FC) in starting each of the motors, wherein the frequency converter (FC) performs the steps of:
  measuring an instantaneous value of voltage of the AC network (L), and
  controlling the source of supply voltage of the motor connected to the frequency converter (FC) before the stop required by a shunt to a desired magnitude and to a desired phase shift with the voltage of the AC network (L).

9. The method according to claim 1, further comprising: determining a data processing time of the frequency converter (FC) and lengths of switching delays of the contactors for determining the starting time of the control of the contactors such that the control of the contactors are able to be started before the stopping of the frequency converter (FC).

10. The method according to claim 9, further comprising: providing switching delays as parameter data.

11. The method according to claim 9, further comprising: using the frequency converter (FC) in starting each of the motors, wherein the frequency converter (FC) performs the steps of:
  measuring an instantaneous value of voltage of the AC network (L), and
  controlling the source of supply voltage of the motor connected to the frequency converter (FC) before the stop required by a shunt to a desired magnitude and to a desired phase shift with the voltage of the AC network (L).

12. The method according to claim 1, further comprising: providing switching delays as parameter data.

13. The method according to claim 12, further comprising: using the frequency converter (FC) in starting each of the motors, wherein the frequency converter (FC) performs the steps of:
  measuring an instantaneous value of voltage of the AC network (L), and
  controlling the source of supply voltage of the motor connected to the frequency converter (FC) before the stop required by a shunt to a desired magnitude and to a desired phase shift with the voltage of the AC network (L).

14. The method according to claim 1, further comprising: using the frequency converter (FC) in starting each of the motors, wherein the frequency converter (FC) performs the steps of:
  measuring an instantaneous value of voltage of the AC network (L), and
  controlling the source of supply voltage of the motor connected to the frequency converter (FC) before the stop required by a shunt to a desired magnitude and to a desired phase shift with the voltage of the AC network (L).

15. An arrangement for first and second AC electric motors (M1, M2, . . . MN) to an AC electricity network (L) in a system, the system comprises:
  a frequency converter (FC), with which each of the first and second motors is started, and
  a pair of contactors (S11, S12, S21, S22, SN1, SN2) corresponding to each of the motors, with which each of the motors can be connected to either the frequency converter (FC) or to the AC electricity supply network (L),
  the system is adapted to start control of the pair of contactors which connect the first motor to the frequency converter (FC),
  stop the frequency converter (FC) after starting the control of the pair of contactors connected to the first motor, and before changing the source of supply voltage of the first motor from the frequency converter (FC) to the AC network (L), and
  then changing the source of supply voltage of the first motor from the frequency converter (FC) to the AC electricity network (L),
  wherein the contactors are adapted to allow only one of the first and second electric motors to be connected to the frequency converter (FC) at any one time, the other of the first and second electric motors being connected to the AC electricity network (L).

16. The arrangement according to claim 15, wherein the frequency converter (FC) is configured such that the control of the contactors needed for changing the source of supply voltage is performed by a control unit of the frequency converter (FC).

17. The arrangement according to claim 15, wherein the frequency converter is configured to determine its own data processing time and lengths of switching delays of the contactors for determining a starting time of the control of the contactors, such that the control of the contactors is able to be started before the stopping of the frequency converter.

18. The arrangement according to claim 15, wherein lengths of switching delays are provided as parameter data.

19. The arrangement according to claim 15, further comprising: means with which lengths of switching delays are able to be measured.

20. The arrangement according to claim 15, wherein the frequency converter used in starting the motor comprises means for measuring an instantaneous value of the voltage of the supply network, and the source of supply voltage of the motor connected to the frequency converter before the stop required by a shunt is able to be controlled to a desired magnitude and to a desired phase shift with the voltage of the AC network (L).

* * * * *